US012153488B2

(12) United States Patent
Pinhas et al.

(10) Patent No.: US 12,153,488 B2
(45) Date of Patent: Nov. 26, 2024

(54) AUTONOMIC TROUBLESHOOTING OF A SYSTEM OF DEVICES

(71) Applicant: Western Digital Technologies, Inc., San Jose, CA (US)

(72) Inventors: Shir Pinhas, Beer Sheva (IL); Tami Mernstein, Bnei Brak (IL); Moriya Saar, Kfar Saba (IL); Eliana Brody Torgeman, Karnei Shomron (IL); Danny Berler, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 227 days.

(21) Appl. No.: 17/852,245

(22) Filed: Jun. 28, 2022

(65) Prior Publication Data
US 2023/0418703 A1 Dec. 28, 2023

(51) Int. Cl.
*G06F 11/00* (2006.01)
*G06F 11/07* (2006.01)

(52) U.S. Cl.
CPC ........ *G06F 11/079* (2013.01); *G06F 11/0757* (2013.01); *G06F 11/0772* (2013.01); *G06F 11/0784* (2013.01)

(58) Field of Classification Search
CPC ............. G06F 11/0757; G06F 11/2092; G06F 11/2097; G06F 11/0724; G06F 11/0766; G06F 11/0793; G06F 11/2033; G06F 11/2023
See application file for complete search history.

(56) References Cited

U.S. PATENT DOCUMENTS

| 9,886,401 | B2 * | 2/2018 | Neeb ..................... G06F 11/079 |
| 11,531,498 | B2 | 12/2022 | Moshe |
| 11,544,205 | B2 | 1/2023 | Moshe |
| 2019/0391894 | A1 * | 12/2019 | Krämer ................. G06F 11/349 |
| 2022/0027224 | A1 * | 1/2022 | Jensen ................ G06F 11/2028 |
| 2024/0143518 | A1 | 5/2024 | Moshe |

* cited by examiner

*Primary Examiner* — Charles Ehne
(74) *Attorney, Agent, or Firm* — Patent Law Works LLP

(57) ABSTRACT

A system and method for autonomic troubleshooting in a system of devices including at least a first device and a second device communicating with each other via a system management bus. The first and second device also communicates with a host device via a separate main bus. The method includes the first device sending a first query, via the system management bus, to the second device. The first device determines if the second device in an error state based on: receiving a response from the second device indicating an error; or absence of a response from the second device. Based on the error state, the first device sends a control command to the second device via the system management bus. In some examples the first device or second device is a data storage device.

20 Claims, 9 Drawing Sheets

AUTONOMIC TROUBLESHOOTING OF A SYSTEM OF DEVICES

TECHNICAL FIELD

This disclosure relates to data communication between devices in a system via a system management bus. In some examples, the disclosure relates to autonomic troubleshooting of errors and sending control commands in response to errors. There is also disclosed a method of autonomic trouble shooting.

BACKGROUND

Troubleshooting an unresponsive device in a system is laborious for the user and typically requires manual intervention through a host device. The host may query an unresponsive device and begin to receive timeouts on sent commands. Diagnosing that the status of a device is unresponsive relies on receiving no live indications from the device.

There are two existing ways of solving this issue. The first involving the host to manually prompt a rescue command, this approach relies on external intervention to recover from internal failure. The second option, involving the device to manually prompt a rescue command, if the device did not receive a host rescue command after a predefined timeout is reached, the device will then perform a self-reset. A self-reset will typically cause the device to disconnect from the main bus.

Once the device is disconnected, the host will lose communication with the device until a power cycle is initiated to establish communication with the main bus. In systems with a PCIe bus for example, the reset will cause a power cycle which will initiate a 'root complex' reset, this reset may cause other PCIe endpoints to reset even though they are working properly. In some examples where there are a plurality of devices, such as data storage devices, this can interfere with continuous access to the data storage devices that are working properly.

SUMMARY

In a first aspect, the present disclosure relates to a computer implemented method for autonomic troubleshooting in a system of devices, including at least a first device and a second device, wherein the first device and second device communicate with each other via a system management bus, the first device and second device communicating with a host device via a separate main bus. The method comprises: sending, via the system management bus, at least a first query from the first device to the second device; determining, with the first device, if the second device is in an error state based on: receiving a response from the second device indicating an error at the second device; or absence of the response from the second device, wherein, in response to determining the second device is in an error state, sending, via the system management bus, a control command from the first device to the second device.

In some examples, the first device is configured to determine if the second device is in the error state based on failure to receive a response during a specified timeout length initiated in response to sending the query.

In some examples, the method comprises: sending at least a first error status request, via the system management bus, from the first device to the second device; receiving at least a first error status report from the second device; determining the error at the second device based on the received first error status report or absence of receiving the first error status report; wherein the control command is selected from a plurality of control commands based on the determined error.

In some examples, before sending, via the system management bus, a control command is determined, associated to the error in the error status report, from a list of control commands.

In some examples, the method comprises: receiving, via the system management bus, the first query from the first device to the second device; wherein in response to the second device in an error state: sending, with the second device, a response indicating an error at the second device via the system management bus; or not sending any response to the first device. Wherein responsive to the second device in the error state, the method further comprises: receiving at the second device, via the system management bus, a control command from the first device; and executing, at the second device, the received control command.

In some examples, the method comprises: receiving, at the first device via the system management bus, at least a second query from the second device, wherein in response to the first device in an error state, the method further comprises: sending a response from the first device indicating an error at the first device via the system management bus; or absence of sending any response from the first device. Wherein responsive to the first device in the error state, the method further comprises: receiving, at the first device via the system management bus, a control command from the second device; and executing, at the first device, the received control command.

In some examples, the second device is configured to determine if the first device is in the error state based on failure to receive a response during a specified timeout length initiated in response to sending the query.

In some examples, the method comprises receiving, at the first device via the system management bus, at least a first error status request from the second device; and sending at least a first error status report to the second device.

In some examples, the method comprises: sending, via the system management bus, at least a second query from the second device to the first device determining, with the second device, if the first device is in an error state based on: receiving a response from the first device indicating an error at the first device; or absence of the response from the first device. Wherein, in response to determining the first device is in the error state, sending, via the system management bus, a control command from the second device to the first device.

In another aspect, the present disclosure relates to a system of devices associated to a computer implemented method for autonomic troubleshooting, wherein a first device and a second device communicate with a host device via a separate main bus, comprising: a system management bus; a first device, wherein the first the device comprises: a first port configured to connect to the host device, via separate main bus, to enable data communication with the host device; a second port configured to connect to the system management bus to enable data communication with the second device; at least one processor configured to: send at least a first query to the second device via the system management bus; determining if the second device is in an error state based on: a response received from the second device, indicating an error at the second device; or an absence of the response from the second device, wherein, in response to a determined error state at the second device, sending, via the system management bus, a control command from the first device to the second device.

In some examples, the first processor is configured to: receive, via the system management bus, at least a second query from the second device; wherein in response to the first device in an error state, the first processor is configured to: send a response indicating an error at the first device via the system management bus; or not to send any response to the second device. Wherein in response to the first device in the error state, the first processor is further configured to: receive, via the system management bus, a control command from the second device; and execute, at the first device, the received control command.

In some examples, the second device is configured to be in data communication with the first device via the system management bus, wherein the second device comprises: a second processor configured to: receive, via the system management bus, the first query from the first device. Wherein in response to the second device in an error state, the second processor is configured to: send a response indicating an error at the second device via the system management bus; or not to send any response to the first device. Wherein in response to the second device in the error state, the second processor is further configured to: receive, via the system management bus, a control command from the first device; and execute, at the second device, the received control command.

In some examples, the second device is configured to be in data communication with the first device via the system management bus, wherein the second device comprises: a second processor configured to: send, via the system management bus, the second query to the first device; determine, if the first device is in an error state based on: at least a response received from the first device, indicating an error at the first device; or absence of a response from the first device. Wherein, in response to a determined error state at the first device, the second processor is further configured to send, via the system management bus, a control command from the second device to the first device.

In some examples, a separate main bus is configured to be electrically coupled to the system management bus via at least a device.

In some examples, a host device is configured to be electrically coupled to the system management bus via at least a device and a separate main bus.

In some examples, at least one device in the system of devices is configured to store at least one control command associated to the error.

In some examples, the separate main bus comprises at least a main serial computer expansion bus standard, wherein the system management bus comprises at least a two-wire interface bus.

In some examples, at least one device component is a non-volatile storage medium configured to store data, and at least one of the devices is a data storage device.

In another aspect, the present disclosure relates a computer implemented method for autonomic troubleshooting, wherein a first device and second device communicate with a host device via a separate main bus, comprising: means for sending at least a first query to a second device on a system of devices, via a system management bus; means for determining if the second device is in an error state based on; a response received from the second device indicating an error at the second device; or absence of a response from the second device; means for sending to at least a second device a control command via the system management bus, wherein the control command is associated to the error state and is sent in response to the second device is determined to be in the error state.

In other examples, the first device comprises: means for receiving at least a first query from a second device via a system management bus; means for sending at least a response indicating an error via a system management bus; means for receiving a control command from the second device via the system management bus, wherein the control command is associated to the error state at the first device; means for executing the control command.

BRIEF DESCRIPTION OF DRAWINGS

Examples of the present disclosure will now be described with reference to the following drawings.

DESCRIPTION OF EMBODIMENTS

Overview

Figure 1:
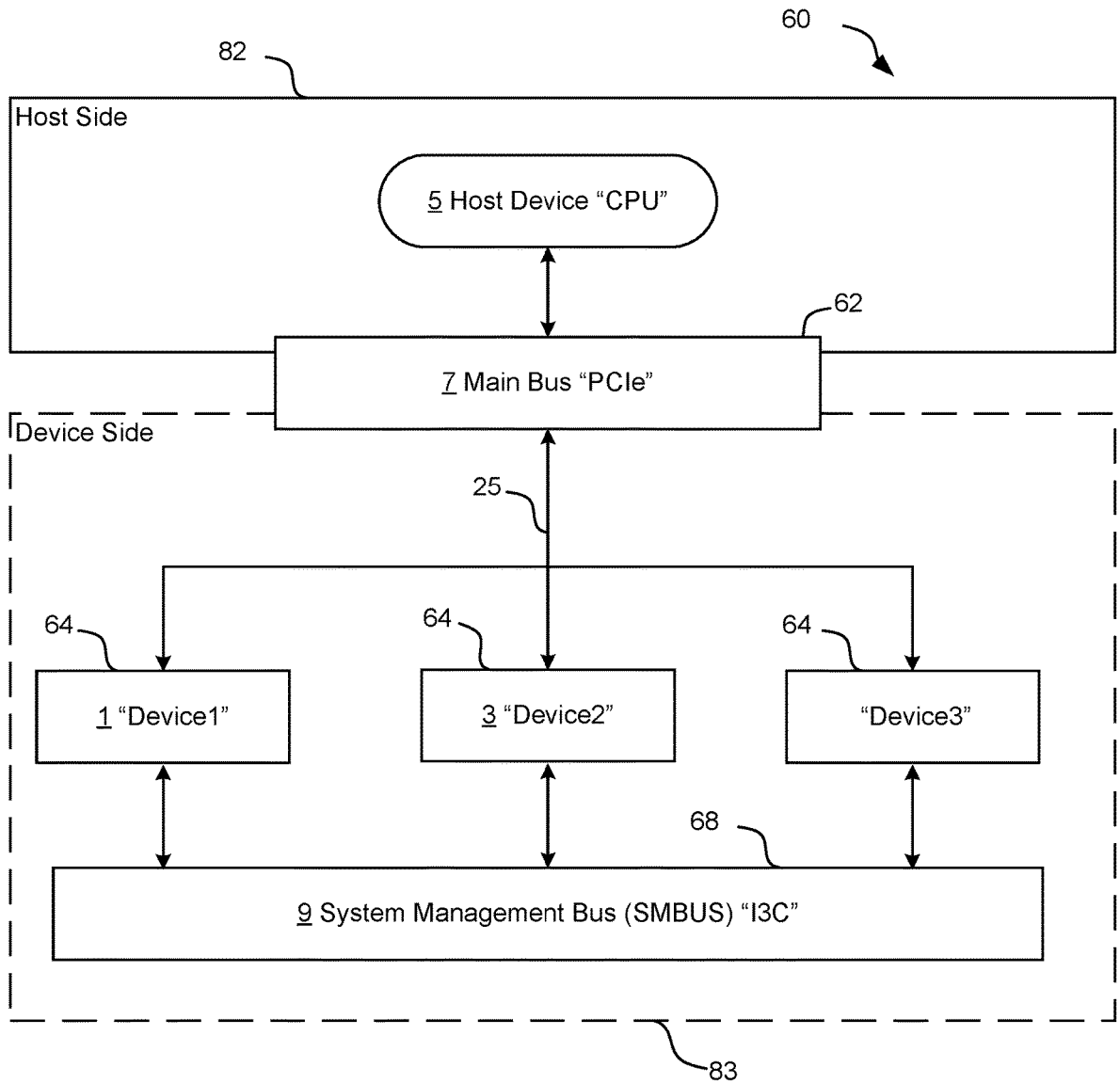
FIG. 1 is a schematic diagram of a system of devices for autonomic troubleshooting including a main bus that connects between a system management bus and a host device.

FIG. 1 illustrates a system of devices 60 for autonomic troubleshooting that includes a main bus 7 that connects between a host side 82 and a device side 83. The device side 83 supports a system management bus "SMBUS" 9 protocol with multiple devices 64 (at least a first device 1 and second device 3) connected with each other via the SMBUS 9. The host side supports a host device 5, which may be a computer, such as desktop computer, laptop computer, tablet, portable communication device, media player, or other electronic devices that can host peripheral devices. The device 64 may include physical data storage device 70 such as solid-state drives (SSD) and hard disk drives (HDD).

In some instances of a failure, the device 64 (at least a first device 1 or second device 3) stops functioning normally with the host device 5 via the main bus 7. However, the secondary bus, SMBUS 9, is still active and is able to transmit control commands 11 that can rescue the device 64. In some examples, the present disclosure provides an SMBUS Autonomic Identification and Rescue control command feature (SMBUS AIRCC) that can perform autonomic troubleshooting for devices supporting SMBUS protocol and through the required physical connections.

In some examples, the SIMBUS AIRCC works as follows. There will be a predefined list of reasons a device 64 is unresponsive paired with control command 11 rescue solutions. Each internal device 64 connected to the SMBUS 9 will monitor the other devices 64 if they are responsive or unresponsive. A device 64 is identified as unresponsive, for example, if the monitoring device receives timeouts on sent commands without receiving a valid response. In the case of one of the devices 64 being in an unresponsive state, the monitoring responsive device 64 will determine or read the error status 37 from the SMBUS 9 and thus perform steps to fix the status error 35. The monitoring device 1 will send the corresponding rescue control command 11 over the SMBUS 9 to recover from the issue in the problematic device 3. Importantly, each internal core inside the device 64 can be separately 'repaired' by another device 64 in the system 60 using this feature and each device 64 in the system 60 can rescue another device 64 in the system 60 using this feature.

Figure 4:
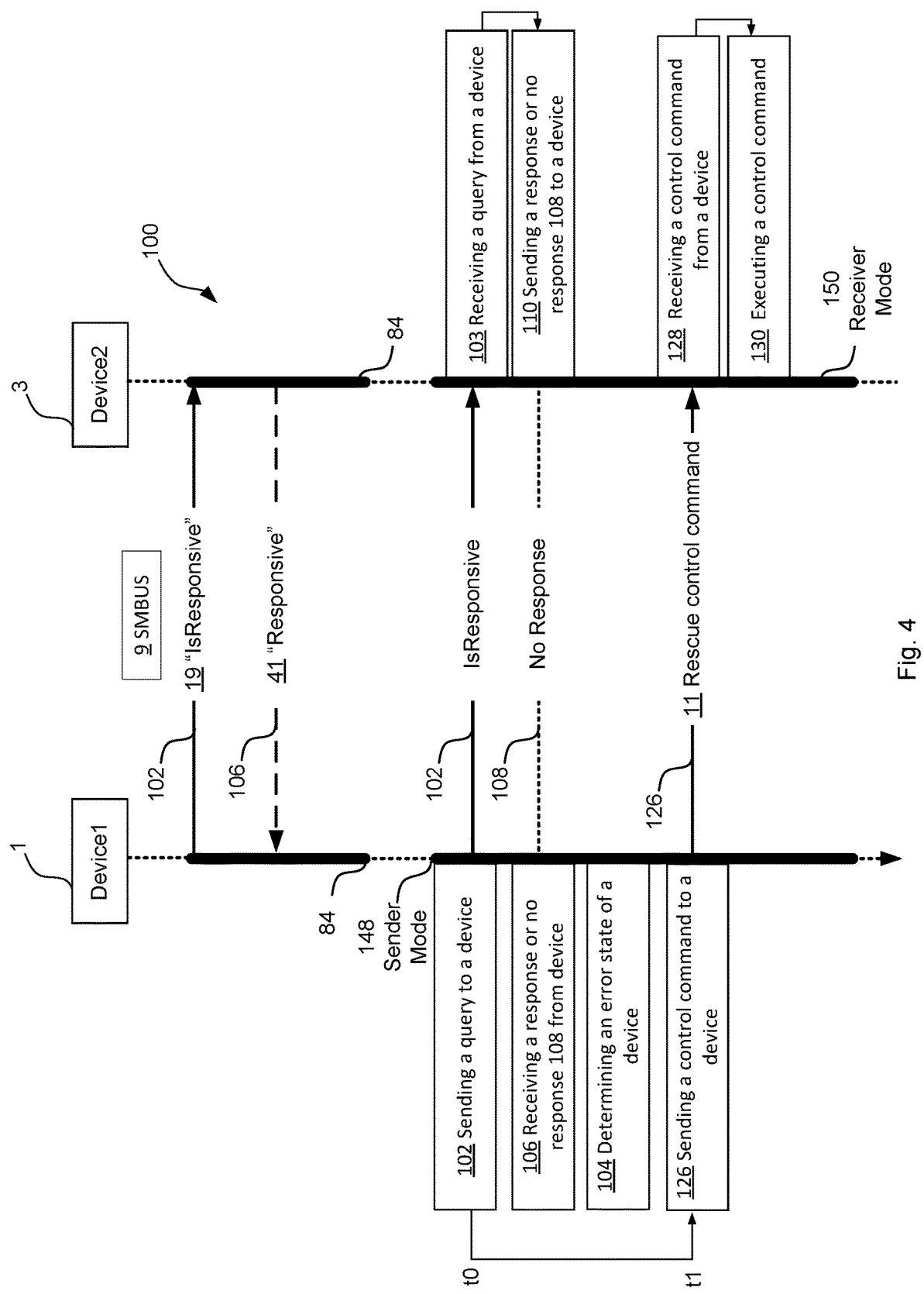
FIG. 4 is an example computer implemented method for autonomic troubleshooting in a system of devices, wherein the first device of FIG. 3 communicates with and troubleshoots a second device in FIG. 2 via a system management bus and sends a control command.

In the preferred embodiment as shown in FIG. 4, in the sender mode (i.e. querying mode), the device 64 is configured to send 102 at least a first query 19 to the second device 3 via the system management bus 9, to determine 104, if the second device 3 is in an error state 37. This is based on, receiving 106 a second response from the second device 41 indicating an error 35 at the second device 3; or alternatively an absence of the response 43 from the second device 3. Based on determining the error state 104 at the second device 3, the first device sends 126, via the system management bus 9, a control command 11 from the first device 1 to the second device 3.

In the preferred embodiment in the receiver mode, the processor 64 is configured to receive, via the system management bus 9, the first query 19 from the first device 1 to the second device; wherein if the second device 1 is in an error state 37: sending 41, with the second device, a second response indicating an error 35 at the second device 1 via the system management bus 9; or not sending any response 41 to the first device 1, wherein while the second device is in the error state 37, the method further comprises: receiving 128 at the second device, via the system management bus 9, a control command 11 from the first device 3; and executing 130, at the second device 3, the received control command 11.

Figure 2:
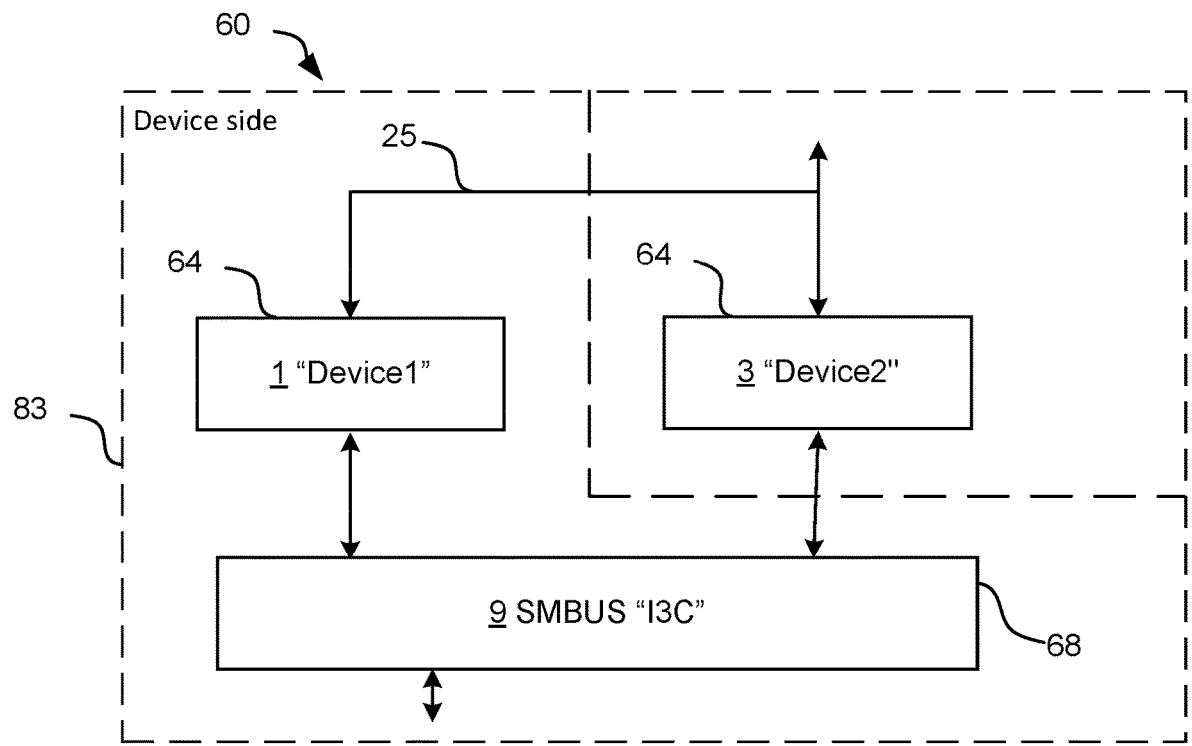
FIG. 2 is a schematic diagram of a system of devices for autonomic troubleshooting wherein the first device connects to a second device via a system management bus.

FIG. 2, for example, illustrates a simplified system of devices 60 for autonomic troubleshooting that includes a system management bus 9 that connects between a first device 1 and a second device 3. The device side 83 supports a system management bus "SMBUS" 9 protocol for communication between at least a first device 1 and second device 3.

An advantageous function of the autonomic troubleshooting system of devices 60 is that no requirement for external intervention (from the host device 5) is needed to recover from internal failure. In systems with a PCIe bus for example, there will be no need for a 'root complex' reset causing other PCIe endpoints to reset even though they are working properly.

Features of the example system will now be described in detail.

Host Device 5

In the preferred embodiment, the host device 5 comprises a device driver, which is configured to communicate with the system of devices 60 over data interface and power interface. In some examples the host device 5 is configured to transmit and receive PCIe compliant signals The system device 64 is configured to interface with the host device 5 via data interface and power interface via first port and power port, respectively. The power port 29 and the first data port (described below) may be implemented collectively as, for example, some form of USB port (e.g., USB-A, USB-8, USB-C, mini-USB, micro-USB, etc.), PCIe, a Thunderbolt port, a Power over Ethernet (PoE) port, or a similar port. The data interface is configured to transport data to and from the data port and the host computer system. In some embodiments, the power interface is configured to provide power from the host computer system to the device via power port. Some examples of the host device 5 are a laptop, desktop or server.

A First Device 1 or Second Device 3

Figure 3:
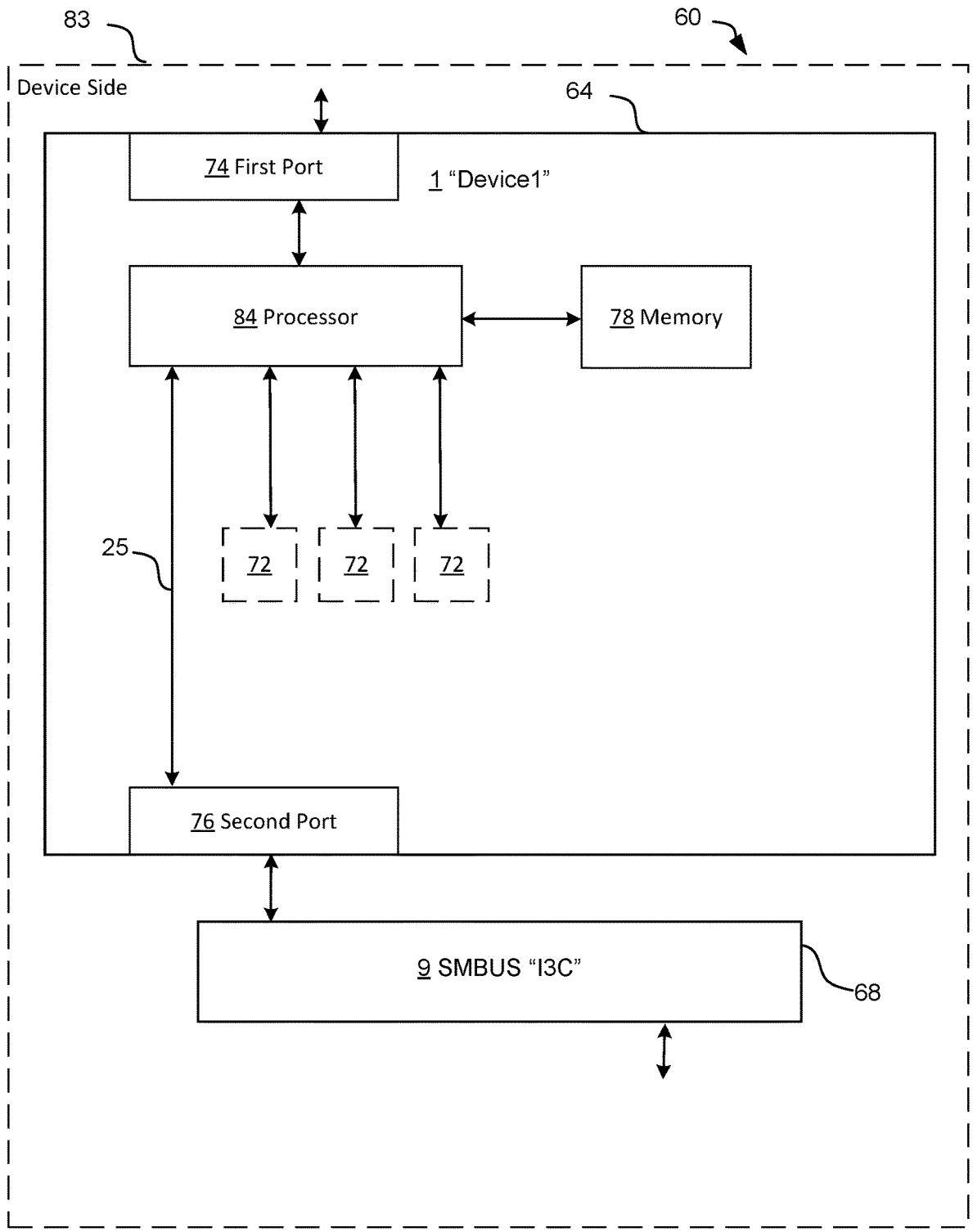
FIG. 3 is a schematic diagram of first example of a device for autonomic troubleshooting, wherein the device includes a first port, a second port, a processor, a memory and at least a device component.

FIG. 3 illustrates the details of the structure of a device 64. For example, the first device 1 in the system of devices 60 includes a first port 74 to connect to the host device 5 via a separate main bus 7 to enable data communication with the host device. The first device also includes a second port 76 to connect to the system management bus 7. Typically, this may include a port connection with wire or cables that enable selective connection of the device 64 to the host device 5 and the system management bus 9. This can include using industry standards such as Peripheral Component Interconnect Express (PCIe standard), two-wire interface bus (supporting I3C/I2C protocol) or Universal Serial Bus (USB standard) cables and connectors. The device 64 also includes a processor 84 supported by the second port 76 to facilitate data communication to a second device 3 via the system management bus 9 to enable data communication with a second device 2. In some examples, the processor 84 is configured to connect to a memory 78, in other examples the processor 84 may be configured to connect to at least another device component 72. In some examples, the first device or second device 3 are data storage devices. In particular examples, the first device and/or second device are solid-state drives (SSD).

System Management Bus 9

In some examples, the system management bus 9 (SMBUS) is a single-ended two-wire bus for the purpose of lightweight communication. In some examples, it is configured for communication with the power source for ON/OFF instructions.

In the preferred embodiment, the SMBUS 9 is used as a means for system components, including simple and power-related chips or devices, to communicate between each other within a system of devices. In some examples, it enables batteries to communicate with other system components, such as the CPU or other power-related components.

In SMBUS 9 communication, there are three types of devices 64 used: a host, a master, and a slave device. The host device is a specialized master that acts as an interface to the system's CPU, but it is not always required; some systems, such as a simple battery charging system, can be host-less. A master device may initiate the communication, perform clock functions, and terminates the transfer. A device 64 may be designated to be only a master or it may be a master-slave, in which it can act as a master or slave device. There also may be more than one master on an SMBUS, but only one acts as a master at a time. Slave devices 64 respond to its address and commands, and can send and receive data to and from a master device. In some examples, a device 64 can be designated exclusively as a slave, or it is possible for the slave to act as a master in certain instances.

In some examples, the SMBUS 9 is based on the I3C protocol and uses I3C as a physical layer, it uses a two-wire interface and device addressing to communicate; each device has a unique address and may be addressed by any other device on the network.

In some examples, the SMBUS uses two wires for communication: the SMBDAT wire, which transfers serial data, and the SMBCLK wire, which acts as the serial clock. The master drives the SMBCLK, which can range from 10 kHz to 100 kHz, but either line can drive the SMBDAT. In some examples, both of these lines are bidirectional. In other examples, the SMBUS also provides the option to add an alert signal, called SMBALERT, which enables devices to request attention from the host.

Similar to I3C, some embodiments of the SMBUS data packet includes a Start bit, 8 bits of data (containing a 7-bit address and Read/Write bit), an ACK/NACK bit, and a Stop bit. In some examples, SMBUS data transfer can use all or some of the various different SMBUS functions or protocols when transferring messages. Some example functions include Quick Command, Send Byte, Write Byte, Write Word, Read Byte, Read Word, Process Call, Block Read, Block Write, and Block Write-Block Read Process Call. In some examples, SMBUS also supports packet error checking, or PEC, to improve communication reliability. This is performed by adding a packet error code at the end of each message.

Some embodiments of the electrical component for the SMBUS devices may be powered by the bus Vdd (1.8 to 5 volts, ±10%) or by another power source, such as VBUS, and can operate coincidently provided they adhere to the SMBUS 9 electrical specifications for their class. In the preferred embodiment, the SMBUS 9 may be also configured to be backward compatible with UART, SPI, or I2C and in some examples will be used to connect many system components such as sensors, displays, always-on (low-resolution) cameras, controllers, capacitive sensors, mobile applications, transducers, acoustics, and other peripherals. In the preferred embodiment, I3C will keep the 2-wire interface that is present in I2C. In some examples, I3C improves on I2C band interrupts, dynamic addressing, handling multi-masters, and standardizing commands with common command codes. In some examples, issues with hot joining, error detection, and error recovery experienced with I2C are also fixed in I3C. In other examples, I3C also reduces energy consumption while providing higher data rates at 12.5 MHz versus the 400 kHz of I2C. All of these improvements will be experienced with I3C while maintaining full compatibility with legacy I2C devices.

In some embodiments, the 2-wire I3C interface uses a push-pull clock line (SCL) and an open drain data line (SDA). The SDA enables slaves to take control of the data line and initiate interrupts. (SPI and I2C can only provide slave interrupts by using a third, dedicated wire.) I3C slaves can request an interrupt when the bus is idle. I3C arbitrates conflicts from multiple slaves by enabling the lowest assigned address to win.

Main Bus 7

In the preferred embodiment the main serial computer expansion bus standard 7 is a peripheral component interconnect express (PCIe) 62 for connecting a computer (host device 5) to one or more peripheral devices. In some examples, PCIe provides lower latency and higher data transfer rates than parallel busses such as PCI and PCI-X. Every device that is connected to a motherboard with a PCIe link has its own dedicated point-to-point connection. This means that devices are not competing for bandwidth because they are not sharing the same bus.

In some examples, peripheral devices that use the main bus for data transfer include graphics adapter cards, network interface cards (NICs), storage accelerator devices and other high-performance peripherals.

In the preferred embodiment of the main bus, data is transferred over two signal pairs: two wires for transmitting and two wires for receiving. In examples using PCIe, each set of signal pairs is called a "lane" and each lane is capable of sending and receiving eight-bit data packets simultaneously between two points.

In some embodiments using PCIe, the main bus can scale from one to 32 separate lanes; it is usually deployed with 1, 4, 8, 12, 16 or 32 lanes. In some examples a main bus device like a NICs might only use four lanes (PCIe x4) while a high-performance graphics adapter that uses 32 lanes (PCIe x32) for top-speed transmission.

In the preferred embodiment of the main bus, the PCIe bus slots are typically backward compatible with other PCIe bus slots, enabling PCIe links that use fewer lanes to use the same interface as PCIe links that use more lanes. For example, a PCIe x8 card could plug into a PCIe x16 slot. PCIe bus slots are not backwards compatible, however, with connection interfaces for older bus standards.

In some examples using PCIe, data center managers can take advantage of high-speed networking across server backplanes, and connect to Gigabit Ethernet, RAID and Infiniband networking technologies outside of the server rack. A main bus using PCIe may also interconnect clustered computers that use HyperTransport.

Some embodiment of the main bus may exhibit higher maximum system bus throughput, lower I/O pin count and smaller physical footprint, better performance scaling for bus devices, a more detailed error detection and reporting mechanism (Advanced Error Reporting, AER), and native hot-swap functionality Additional features of the device 1 will now be described with reference to FIG. 3.

Ports 74 and 76

Referring to FIG. 3, the device 64 includes first and second ports 74, 76 at a body of the device 1. Thus, separate connectors are used to connect the device 1 to the SMBUS 9 and host device 5. However, it is to be appreciated that one or more of the cables may be integral to the device 1. In other examples, the first and/or second ports 74, 76 may enable direct connection with corresponding connectors of the SMBUS 9 and host device 5 without an intermediate cable.

In some examples the device 1, the first port 74 or second port 76 may include the power, ground, TX pins, and RX pins so that the SMBUS 9 can be in data and power communication with the system device 1.

In some examples, the first port 74 includes connectors utilizing the Peripheral Component Interconnect (PCI) standard. In some specific examples, this includes using components compatible with PCI Express.

In some examples, the second port 76 uses connectors utilizing a two-wire interface bus standard. In some specific examples, this includes using components compatible with supporting Improved Inter Integrated Circuit MIPI I3C, Inter Integrated Circuit I2C and Serial Peripheral Interface SPI protocols.

Processor 84

A processor 84 is an integrated electronic circuit that performs the calculations that run a computer. In the preferred embodiment, the processor performs arithmetical, logical, input/output (I/O) and other basic instructions that are passed from an operating system (OS) via the host device. Most other processes are dependent on the operations of a processor 84.

In some embodiments the processor is a microprocessor, a graphics processing unit (GPU), or even components in a data storage devices capable of performing some processing.

Memory 78

Device memory 78 is a means to temporarily store data and instructions for use by the processor 84. In some examples, device memory 78 is Random Access Memory RAM. In some example accessed randomly for processing. Previous versions of system memory were accessed sequentially. System memory 78 is typically attached to the motherboard in the form of a chip or module called a DIMM (Dual Inline Memory Module), which is a circuit board that holds the memory chips and plugs into specific slots on the motherboard.

In some embodiments, the memory 78 is DRAM or Dynamic RAM, which means that the memory must continually be refreshed or recharged upwards several thousands of times a second. If it is not refreshed, the RAM will lose its stored content. In other embodiments, the memory 78 is SRAM or Static RAM, which does not have to be refreshed and is therefore faster than DRAM.

In some examples, system of devices 60 is configured to store at least one control command 11 associated to the error in RAM. Examples of rescue control commands (the possibilities are just about endless) include: Reset, Jump to, Wait elsewhere, Reset IP, Thermal Adjustment, Performance level Adjustment Device Component 72

The device component 72 associated to a device function is configured to connect to the processor 84. Examples of device components may be related to sensors, displays, always-on (low-resolution) cameras, controllers, capacitive sensors, mobile applications, transducers, acoustics, and other peripherals.

Some examples of the device 64 or device component 72 is a storage medium to store user content data. The user content data includes one or more blocks of data organized into files, for example including images, documents, videos, etc., according to a particular file system operable by the host computer 5. In some examples, the content data is associated to rescue commands.

In some embodiments, the device 64 or device component 72 is a non-volatile storage medium 72 configured to store data. The storage medium 72 is non-transitory such as to retain the stored block data irrespective of whether the medium 72 is powered. The medium 72 may be a component of a hard disk drive (HDD) with a rotating magnetic disk or a solid state drive (SSD), or other data storage device and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 72 may be a block data storage device, such that the user content data is written in blocks to the storage medium 72 and read in blocks from the storage medium 72.

In some embodiments, the device 64 is a data storage device that includes a cryptography engine configured to receive, interpret and execute commands received at the device 64 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine is connected between the first port 74 and the storage medium 72 and is configured to use a cryptographic key to encrypt user content data to be stored on the storage medium 72, and to decrypt the encrypted user content data stored on the storage medium 72 in response to a request from the host device 5. That is, the access controller issues commands to the data path components to cause the cryptography engine to control the form of the user content data (i.e., encrypted or plain). For example, the access controller may provide a key to the first port 74, which the first port 27 then forwards to the cryptography engine.

First Example of a Computer Implemented Method 100 for Autonomic Troubleshooting A general example of use of the system of devices 60 for autonomic troubleshooting will now be described with reference to FIG. 4 and corresponding FIG. 1 to FIG. 3. In this example, the first device 1 is in the sender mode 148 and the second device 3 is in the receiver mode 150.

FIG. 4 illustrates communication between a first device 1 and a second device 3 via a system management bus 9. In this example, the first device 1 initiates communication with device 2 by sending 102 a query to the second device 3 on the system management bus 9. In the preferred embodiment, all devices on the SMBUS 9 are connected to it through the I3C protocol. In some examples, the query is an 'IsResponsive' command.

If the second device 3 is responsive, it will receive 103 the query from the first device 1 and send 100 back a response to the first device 1. Determination 104 of whether the second device 3 is faulty or in working condition depends on the duration of time the first device must wait before receiving 106 a response. In some examples, the response is a 'Responsive' indication. In some embodiments, the received response may indicate an error or there may be an absence of a response from the second device 3.

Based on determining the error state 104 at the second device 3, the first device 1 sends 126, via the system management bus 9, a control command 11 to the second device 3. The second device 3 receives 128 the control command 11 and proceeds to execute the control command 11.

Second Example of a Computer Implemented Method for Autonomic Troubleshooting

The system management bus 9 supports devices to being monitored by other devices in the system. The example of an alternate use of the system of devices 60 for autonomic troubleshooting will now be described with reference to FIG. 5 and corresponding FIG. 1 to FIG. 3. In this example, the first device 1 is in the receiver mode 150 and the second device 3 is in the sender mode 148.

Figure 5:
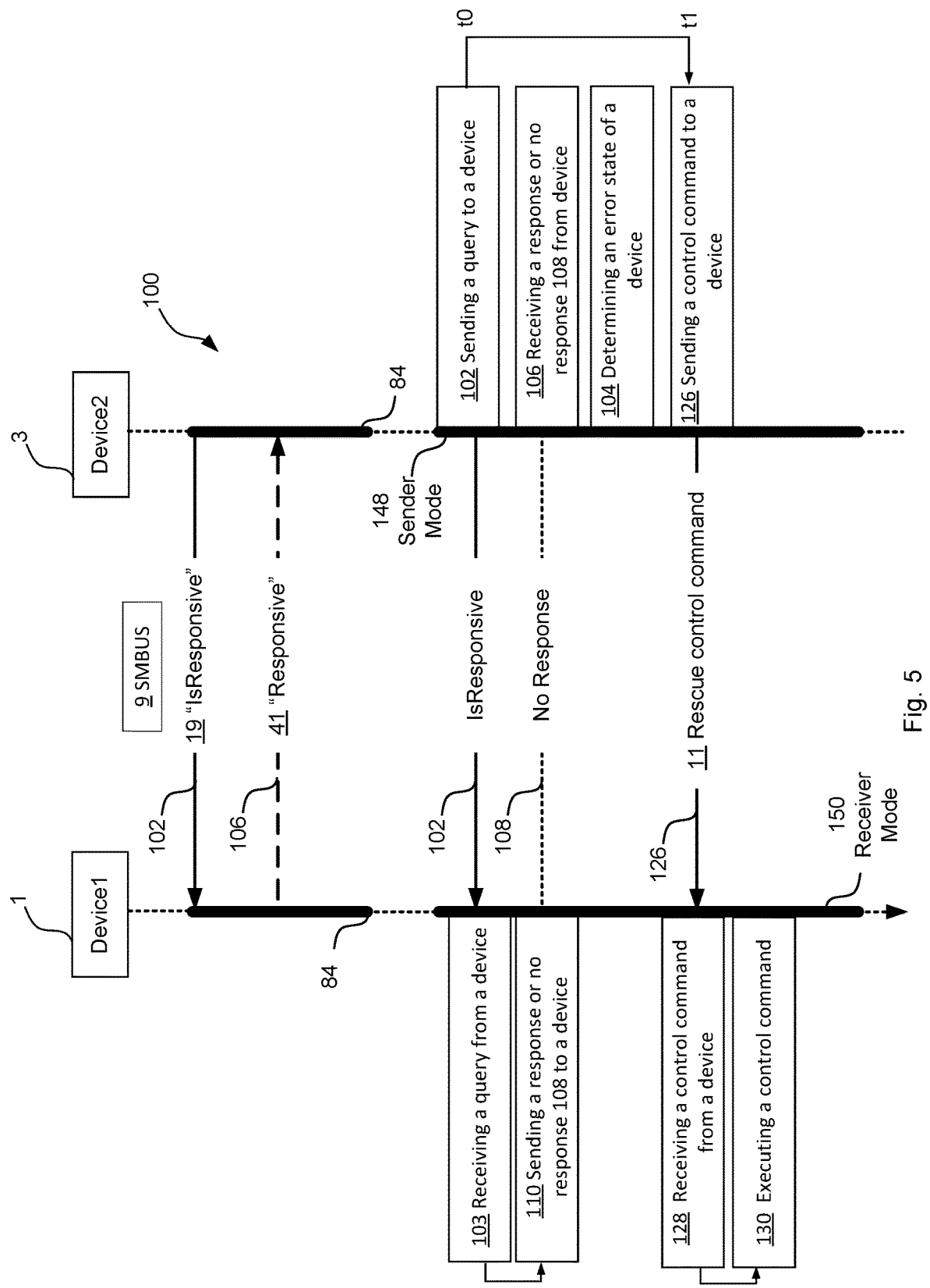
FIG. 5 is an example computer implemented method for autonomic troubleshooting in a system of devices, wherein the second device of FIG. 2 communicates with and troubleshoots a first device in FIG. 3 via a system management bus and sends a control command.

FIG. 5 illustrates communication between a second device 3 and a first device 1 via a system management bus 9. In this example, the second device 3 initiates communication with first device 1 by sending 102 a query to the first device 3 on the system management bus 9. In the preferred embodiment, all devices on the system management bus 9 are connected to it through the I3C protocol. In some examples, the query is an 'IsResponsive' command.

If the first device 1 is responsive, it will receive 103 the query from the second device 1 and send 100 back a response to the second device 1. Determination 104 of whether the first device 3 is faulty or in working condition depends on the duration of time the second device must wait before receiving 106 a response. In the some examples, the response is a 'Responsive' indication. In some embodiments, the received response may indicate an error or there may be an absence of a response from the first device 3.

Based on determining the error state 104 at the first device 3, the second device 1 sends 126, via the system management bus 9, a control command 11 to the first device 3. The first device 3 receives 128 the control command 11 and proceeds to execute the control command 11.

Third Example of a Computer Implemented Method for Autonomic Troubleshooting

Another example of use of the system of devices 60 for autonomic troubleshooting will now be described with reference to FIG. 6 and corresponding FIG. 1 to FIG. 3. In this example, the first device 1 is in the sender mode 148 and the second device 3 is in the receiver mode 150. In other examples, the first device 1 is in the receiver mode 148 and the second device 3 is in the sender mode 150.

Figure 6:
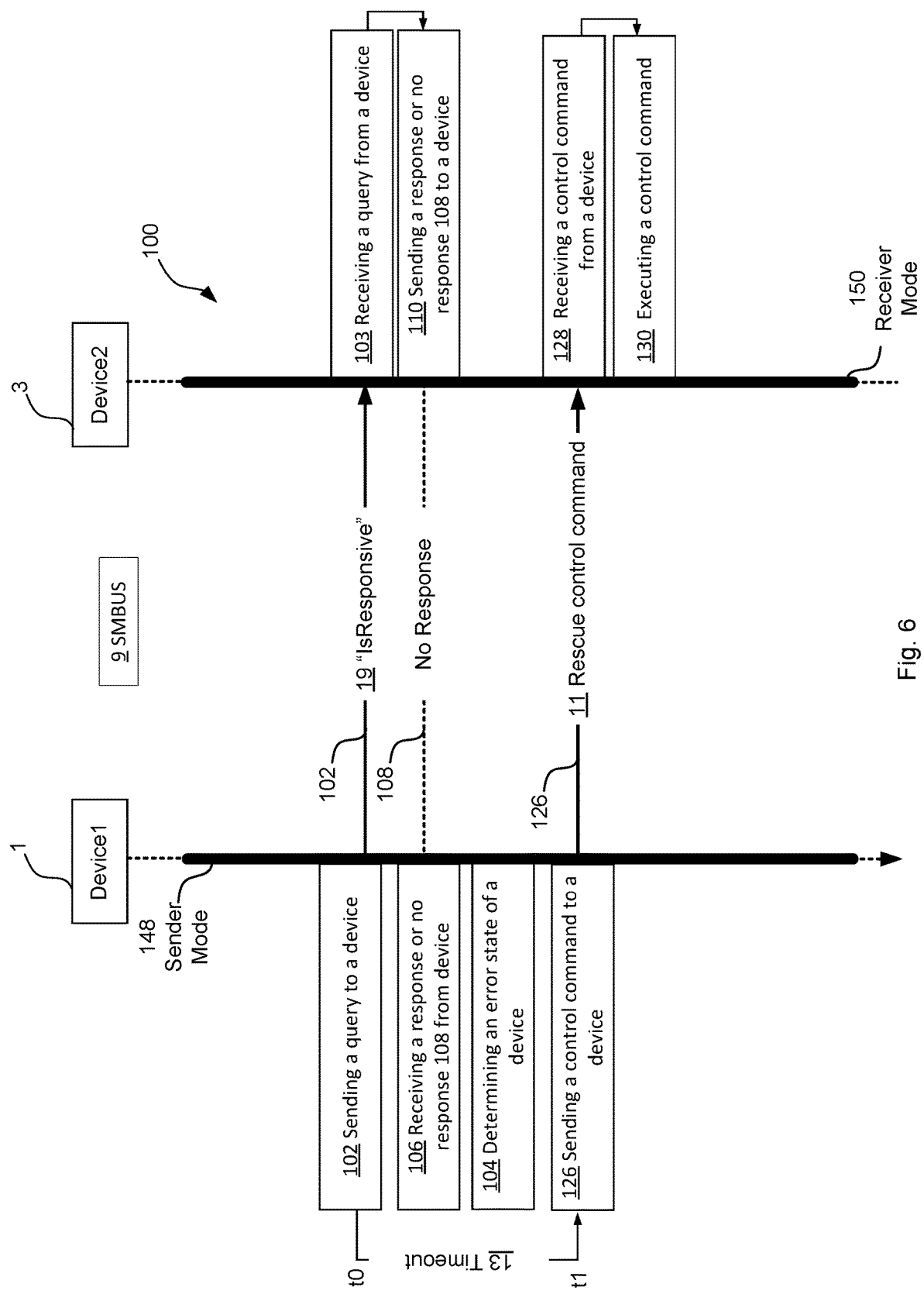
FIG. 6 is an example computer implemented method for autonomic troubleshooting in a system of devices, wherein the first device of FIG. 3 communicates with and troubleshoots a second device in FIG. 2 via a system management bus and sends a control command based on a specified timeout length.

FIG. 6 illustrates communication between a first device 1 and a second device 3 via a system management bus 9. In this example, the first device 1 initiates communication with device 2 by sending 102 a query to the second device 3 on the system management bus 9. In the preferred embodiment, all devices on the SMBUS 9 are connected to it through the I3C protocol. In some examples, the query is an 'IsResponsive' command.

If the second device 3 is responsive, it will receive 103 the query from the first device 1 and send 100 back a response to the first device 1. Determination 104 of whether the second device 3 is faulty or in working condition depends on the duration of time the first device must wait, with reference to a pre-defined time (AKA: TIMEOUT) for a 'Responsive' indication. In the event that the 'IsResponsive query' TIMEOUT is reached, the first device 1 will read an unresponsive status (ErrorStatus) and according to the ErrorStatus, the first device 1 will send a rescue control command 11 to unresponsive second device 3 through the system management bus. In some examples, the response is a 'Responsive' indication. In some embodiments, the received response may indicate an error or there may be an absence of a response from the second device 3.

In the preferred embodiment, the specified timeout length 13 is initiated when the query is sent 102. Alternatively, each device 64 will be monitored by another one or more devices 64 using the 'IsResponsive' command.

Based on determining the error state 104 at the second device 3, the first device 1 sends 126, via the system management bus 9, a control command 11 to the second device 3. The second device 3 receives 128 the control command 11 and proceeds to execute the control command 11.

Fourth Example of a Computer Implemented Method for Autonomic Troubleshooting

Another example of use of the system of devices 60 for autonomic troubleshooting will now be described with reference to FIG. 7 and corresponding FIG. 1 to FIG. 3. In this example, the first device 1 is in the sender mode 148 and the second device 3 is in the receiver mode 150. In other examples, the first device 1 is in the receiver mode 148 and the second device 3 is in the sender mode 150.

Figure 7:
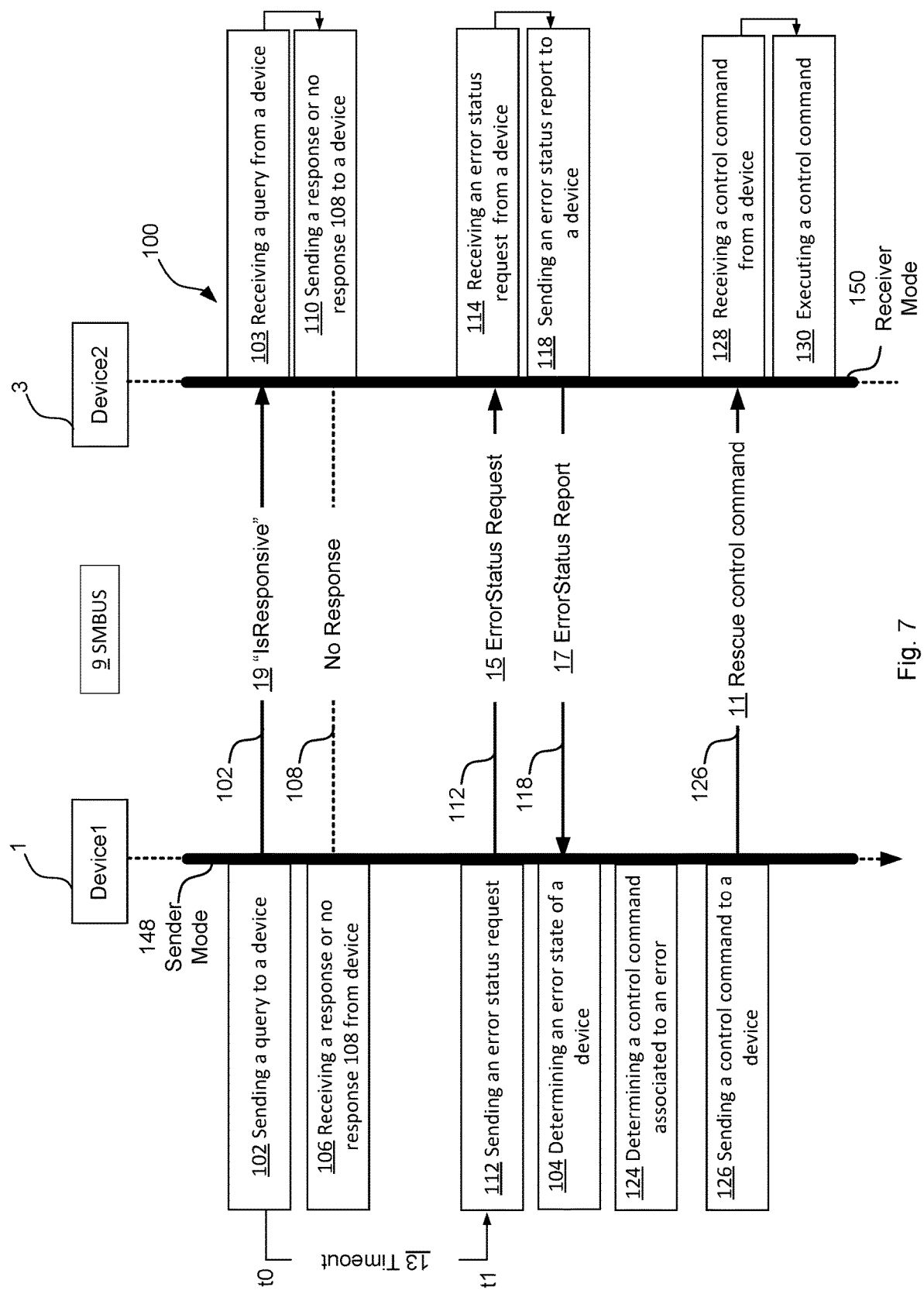
FIG. 7 is an example computer implemented method for autonomic troubleshooting in a system of devices, wherein the first device of FIG. 3 communicates with and troubleshoots a second device in FIG. 2 via a system management bus and sends a control command based on a specified timeout length and error status report.

FIG. 7 illustrates communication between a first device 1 and a second device 3 via a system management bus 9. In this example, the first device 1 initiates communication with device 2 by sending 102 a query to the second device 3 on the system management bus 9. In the preferred embodiment, all devices on the system management bus 9 are connected to it through the I3C protocol. In some examples, the query is an 'IsResponsive' command.

If the second device 3 is responsive, it will receive 103 the query from the first device 1 and send 100 back a response to the first device 1. In the event that the 'IsResponsive query' TIMEOUT is reached, the first device 1 will read an unresponsive status (error status) and according to the error status, once the pre-defined time, 'TIMEOUT' has elapsed the first device 1 sends 112 an error status request 15, via the system management bus 9, to the second device 3. In the preferred embodiment, the specified timeout length 13 is initiated when the query is sent 102. The second device 3 then receives 114 the error status request 15 and sends 118 an error status report 17 to the first device 1. Determination 104 of whether the second device 3 is faulty or in working condition depends on the received 120 error status report 17. In some embodiments, there may be an absence of receiving the first error status report 17. In some examples, determination 104 of whether the second device 3 is faulty or in working condition depends on the duration of time the first device 1 must wait before receiving 106 a response or error status report 17.

In the preferred embodiment, the control command 11 is selected from a plurality of control commands 11 based on the determined error 37 in the error status report 17. In the preferred embodiment, the control commands are stored on the memory 78 of the device 64. In some embodiments, a selected control command 11 may be directly associated to the error 23 in the error status report 17

Based on determining the error state 104 at the second device 3, the first device 1 sends 126, via the system management bus 9, a control command 11 to the unresponsive second device 3. The second device 3 receives 128 the control command 11 and proceeds to execute the control command 11.

Fifth Example of a Computer Implemented Method for Autonomic Troubleshooting

Another example of use of the system of devices 60 for autonomic troubleshooting will now be described with reference to FIGS. 8 and 9 and corresponding FIGS. 1 to 3. In this example, the first device 1 is in the sender mode 148 and multiple second devices 3 are in the receiver mode 150. In other examples, the first device 1 is in the receiver mode 148 and multiple second devices 3 are in the sender mode 150.

Figure 8:
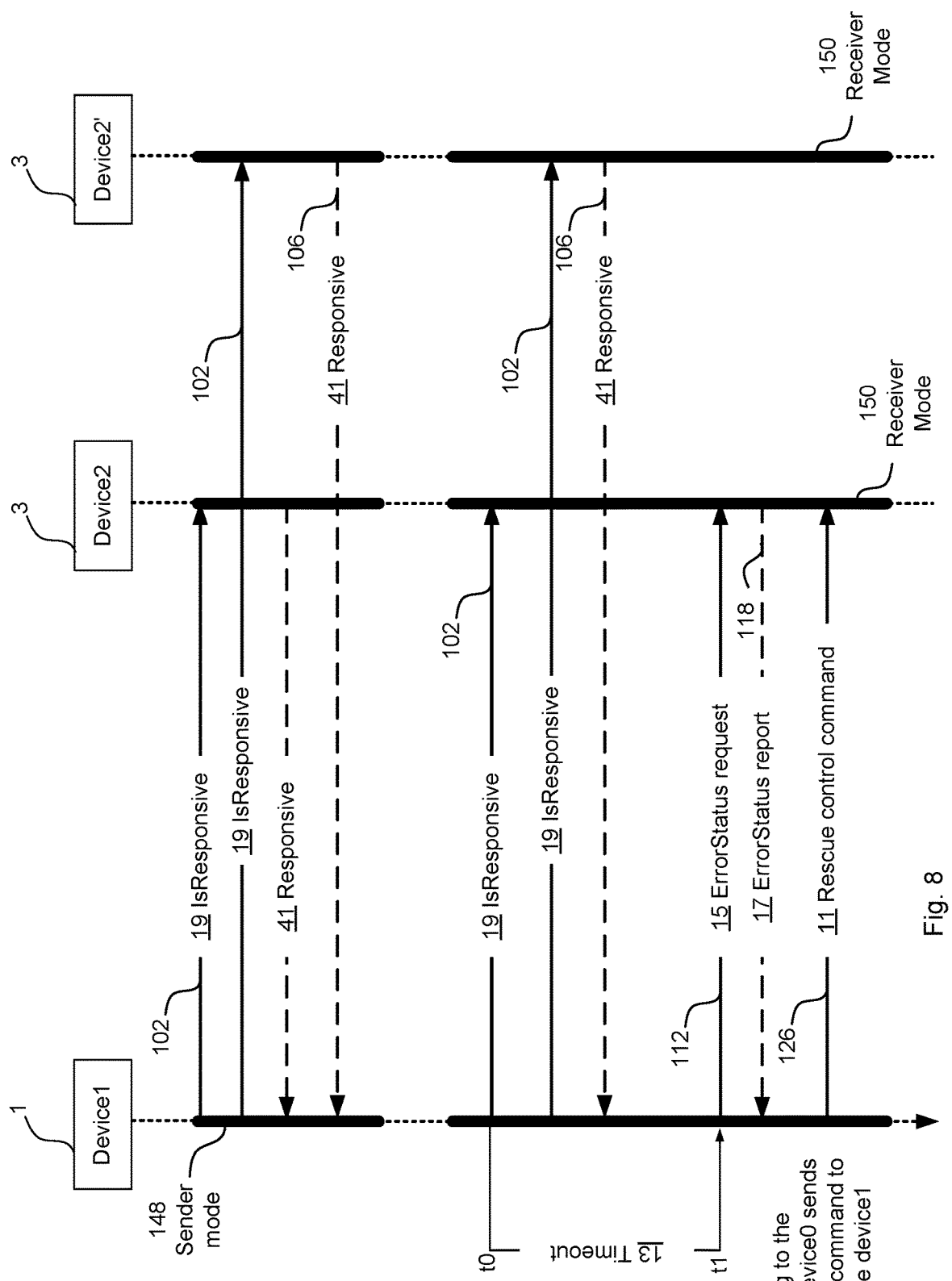
FIG. 8 is an example computer implemented method for autonomic troubleshooting in a system of devices, wherein the first device of FIG. 3 sequentially communicates with and troubleshoots a second device and other device in FIG. 2 via a system management bus and sends a control command based on a specified timeout length and error status report.
Figure 9:
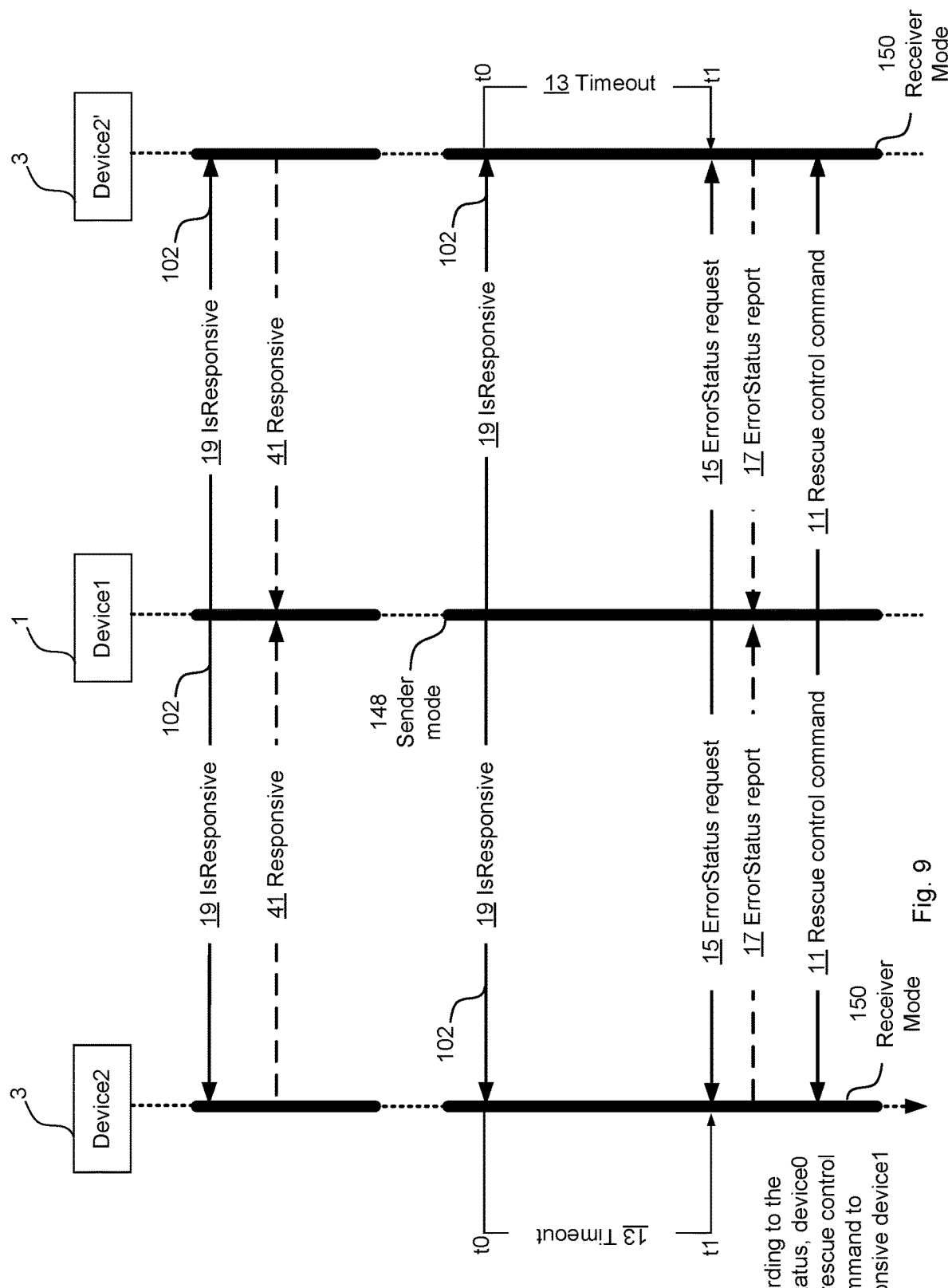
FIG. 9 is an example computer implemented method for autonomic troubleshooting in a system of devices, wherein the first device of FIG. 3 simultaneously communicates with and troubleshoots a second device and other device in FIG. 2 via a system management bus and sends a control command based on a specified timeout length and error status report.

FIGS. 8 and 9 illustrate sequential and simultaneous communication respectively between a first device 1 and multiple second devices 3 via a system management bus 9. In this example, the first device 1 initiates communication with device 2 by sending 102 a query to the second device 3 on the system management bus 9. In the preferred embodiment, all devices on the system management bus 9 are connected to it through the I3C protocol. In some examples, the query is an 'IsResponsive' command.

If multiple second devices 3 are responsive, they will receive 103 the query from the first device 1 and send 100 back a response to the first device 1. In the event that the 'IsResponsive query' TIMEOUT is reached without a valid response 41, and the first device 1 will determine an unresponsive status (error status) for that second device 3. According to the error status, once the pre-defined time, 'TIMEOUT' has elapsed the first device 1 sends 112 an error status request 15, via the system management bus 9, to the unresponsive second device 3, or all the multiple second devices 3. In the preferred embodiment, the specified timeout length 13 is initiated when the query is sent 102. The multiple second devices 3 then receive 114 the error status request 15 and each send 118 an error status report to the first device 1. Determination 104 of whether any of the second devices 3 are faulty or in working condition depends on the received 120 error status report 17. In some embodiments, there may be an absence of receiving the first error status report 17. In some examples, determination 104 of whether any of the second devices 3 are faulty or in working condition depends on the duration of time the first device 1 must wait before receiving 106 a response or error status report 17.

In the preferred embodiment, the control command 11 is selected from a plurality of control commands 11 based on the determined error 37 in the error status report 17. In the preferred embodiment, the control commands are stored on the memory 78 of the first device 1 or any of the second devices 3. In the preferred embodiments, a selected control command 11 is directly associated to the error 23 in the error status report 17

Based on determining the error state 104 at the second device 3, the first device 1 sends 126, via the system management bus 9, a control command 11 to the unresponsive second device 3. The second device 3 receives 128 the control command 11 and proceeds to execute the control command 11.

Type of Control Command 11

The control commands 11 may include one or more types of rescue control commands. In some examples, these are selected based on the determined error state. This can include (but not limited to) one or more of the following:

Reset
Jump to
Wait elsewhere
Reset IP
Thermal adjustment
Performance level adjustment In some examples, where there is an unspecified error or error that cannot be determined (which is also an error state); the method may include specifying a particular reset control command.

Advantages

In systems supporting SMBUS/I3C protocol with multiple devices connected in array and with each other by the SMBUS, upon system failure like HALT, Memory issues, Thermal throttling warm up, faulty wake up, power management problems, etc., the device will disconnect from the main bus (PCIe bus/SATA). Since the device is in failure, it will not respond to any HOST commands. The HOST is required to first recognize that the device is not responding, resuscitate, and reconnect the device to the main bus to re-establish communication.

This is a problem because the HOST is required to be involved in the devices system issues that can be solved in an autonomic internal way using the secondary bus (SMBUS). The SMBUS AIRCC can improve reliability as there is no need for host input (however, it may still respond to separate HOST commands). This avoids the requirement for a host manual prompt for rescue command and avoids a 'root complex reset' (i.e. other PCIe endpoints to reset needlessly if only one component is unresponsive). Furthermore, the SMBUS AIRCC avoids problems related to HALT failure, memory issues, thermal throttling warm up, faulty wake up, and power management problems.

Another benefit is that some embodiments decrease the devices internal issues reports to the host device administrators. Devices will recover from fatal failures internally thus increase reliability. Devices will not disconnect from the PCIe bus enabling recovery to take less time. The system of devices will rescue itself in an autonomic way without host device 5 involvement. These devices will have improved performance and better latency, with the implementation of autonomic rescue control commands.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer implemented method comprising:
    sending, via a system management bus, at least a first query from a first device to a second device, wherein each device of the first device and the second device is a data storage device comprising:
        a main bus port configured for communication with a host device using a main bus that is separate from the system management bus; and
        a system management bus port configured for communication, using the system management bus, among a plurality of devices including the first device and the second device;
    determining, with the first device, that the second device is in a first error state based on:
        receiving a response from the second device indicating an error at the second device; or
        absence of the response from the second device; and
    sending, responsive to determining that the second device is in the first error state and via the system management bus, a first control command from the first device to the second device.

2. The computer implemented method according to claim 1, wherein the first device is configured to determine that the second device is in the first error state based on failure to receive the response from the second device during a specified timeout length initiated in response to sending the first query.

3. The computer implemented method according to claim 1, further comprising:
   sending at least a first error status request, via the system management bus, from the first device to the second device;
   receiving, via the system management bus and by the first device, at least a first error status report from the second device;
   determining, by the first device, the error at the second device based on the received first error status report; and
   selecting, by the first device, the first control command from a plurality of control commands based on the determined error.

4. The computer implemented method according to claim 3, further comprising:
   determining, by the first device and prior to sending the first control command, at least one control command associated to the error in the first error status report from a list of control commands, wherein selecting the first control command is from the at least one control command.

5. The computer implemented method according to claim 1, further comprising:
   receiving, via the system management bus, the first query from the first device to the second device;
   sending, by the second device and via the system management bus, the response indicating the error at the second device;
   receiving, at the second device and via the system management bus, the first control command from the first device; and
   executing, at the second device, the received first control command.

6. The computer implemented method according to claim 1, further comprising:
   receiving, at the first device via the system management bus, at least a second query from the second device
   sending, responsive to a second error state of the first device and via the system management bus, a response to the second query from the first device indicating an error at the first device;
   receiving, at the first device via the system management bus and responsive to the second error state of the first device, a second control command from the second device; and
   executing, at the first device, the received second control command.

7. The computer implemented method according to claim 6, wherein the second device is configured to determine that the first device is in the second error state based on failure to receive the response to the second query during a specified timeout length initiated in response to sending the second query.

8. The computer implemented method according to claim 6, further comprising:
   receiving, at the first device via the system management bus, at least a first error status request from the second device; and
   sending, by the first device via the system management bus, at least a first error status report to the second device.

9. The computer implemented method according to claim 6, further comprising:
   sending, via the system management bus, at least the second query from the second device to the first device;
   determining, with the second device, that the first device is in the second error state based on:
      receiving the response to the second query from the first device indicating the error at the first device; or
      absence of the response to the second query from the first device; and
   sending, via the system management bus and responsive to determining the first device is in the second error state, the second control command from the second device to the first device.

10. A system comprising:
   a system management bus configured for communication between a first device and a second device, wherein each device of the first device and the second device is a data storage device; and
   the first device, wherein the first device comprises:
      a first port of the first device configured to connect, via a main bus that is separate from the system management bus, to a host device to enable data communication with the host device;
      a second port of the first device configured to connect to the system management bus to enable data communication with the second device; and
      at least one processor of the first device configured to, alone or in combination:
         send at least a first query to the second device via the system management bus;
         determine that the second device is in a first error state based on:
            a response to the first query received from the second device and indicating an error at the second device; or
            an absence of the response to the first query from the second device; and
         send, via the system management bus and responsive to determining the first error state at the second device, a first control command from the first device to the second device.

11. The system according to claim 10, wherein the at least one processor of the first device is further configured to, alone or in combination:
   receive, via the system management bus, at least a second query from the second device;
   send, via the system management bus and responsive to the first device being in a second error state, a response to the second query indicating an error at the first device to the second device;
   receive, via the system management bus and responsive to the first device being in a second error state, a second control command from the second device; and
   execute the received second control command.

12. The system according to claim 10, further comprising:
   the second device comprising:
      a first port of the second device configured to connect, via the main bus that is separate from the system management bus, to the host device-to enable data communication with the host device;
      a second port of the second device configured to connect to the system management bus to enable data communication with the first device; and
      at least one processor of the second device configured to, alone or in combination:
         receive, via the system management bus, the first query from the first device;

send, via the system management bus and responsive to the second device being in the first error state, a response indicating the error at the second device;
receive, via the system management bus, the first control command from the first device; and
execute, at the second device, the received first control command.

13. The system according to claim 11, further comprising:
the second device comprising:
at least one processor of the second device configured to, alone or in combination:
send, via the system management bus, the second query to the first device;
determine that the first device is in the second error state based on:
the response to the second query received from the first device and indicating the error at the first device; or
absence of the response to the second query from the first device; and
send, via the system management bus and responsive to determining that the first device is in the second error state, the second control command from the second device to the first device.

14. The system according to claim 10, further comprising:
the main bus configured to be electrically coupled to the system management bus via at least the first device and the second device.

15. The system according to claim 10, further comprising:
the host device configured to be electrically coupled to the system management bus via at least:
the first device;
the second device; and
the main bus.

16. The system according to claim 10, wherein the first device is configured to store at least one control command associated to the error.

17. The system according to claim 10, wherein:
the main bus comprises at least a main serial computer expansion bus standard; and
the system management bus comprises at least a two-wire interface bus.

18. The system according to claim 10, wherein:
the first device comprises a non-volatile storage medium of the first device configured to store data; and
the second device comprises a non-volatile storage medium of the second device configured to store data.

19. A first device comprising:
a first port configured to connect, via a main bus that is separate from a system management bus, to a host device to enable data communication with the host device;
a second port configured to connect to the system management bus to enable data communication with a second device, wherein each device of the first device and the second device is a data storage device;
a non-volatile storage medium configured to store data;
means for sending, via the system management bus, at least a first query to the second device;
means for determining that the second device is in a first error state based on:
a response to the first query received from the second device indicating an error at the second device; or
absence of a response to the first query from the second device; and
means for sending, via the system management bus and responsive to determining that the second device is in the first error state, a first control command to the second device, wherein the first control command is associated to the first error state.

20. The first device according to claim 19, further comprising:
means for receiving, via the system management bus, at least a second query from the second device;
means for sending, via the system management bus, at least a response to the second query indicating an error at the first device;
means for receiving, via the system management bus, a second control command from the second device, wherein the second control command is associated to a second error state at the first device; and
means for executing the second control command.

* * * * *